Sept. 27, 1966    G. B. LANPHERE    3,274,866
AUXILIARY FACING STOP CONTROL SYSTEM
Filed April 10, 1964
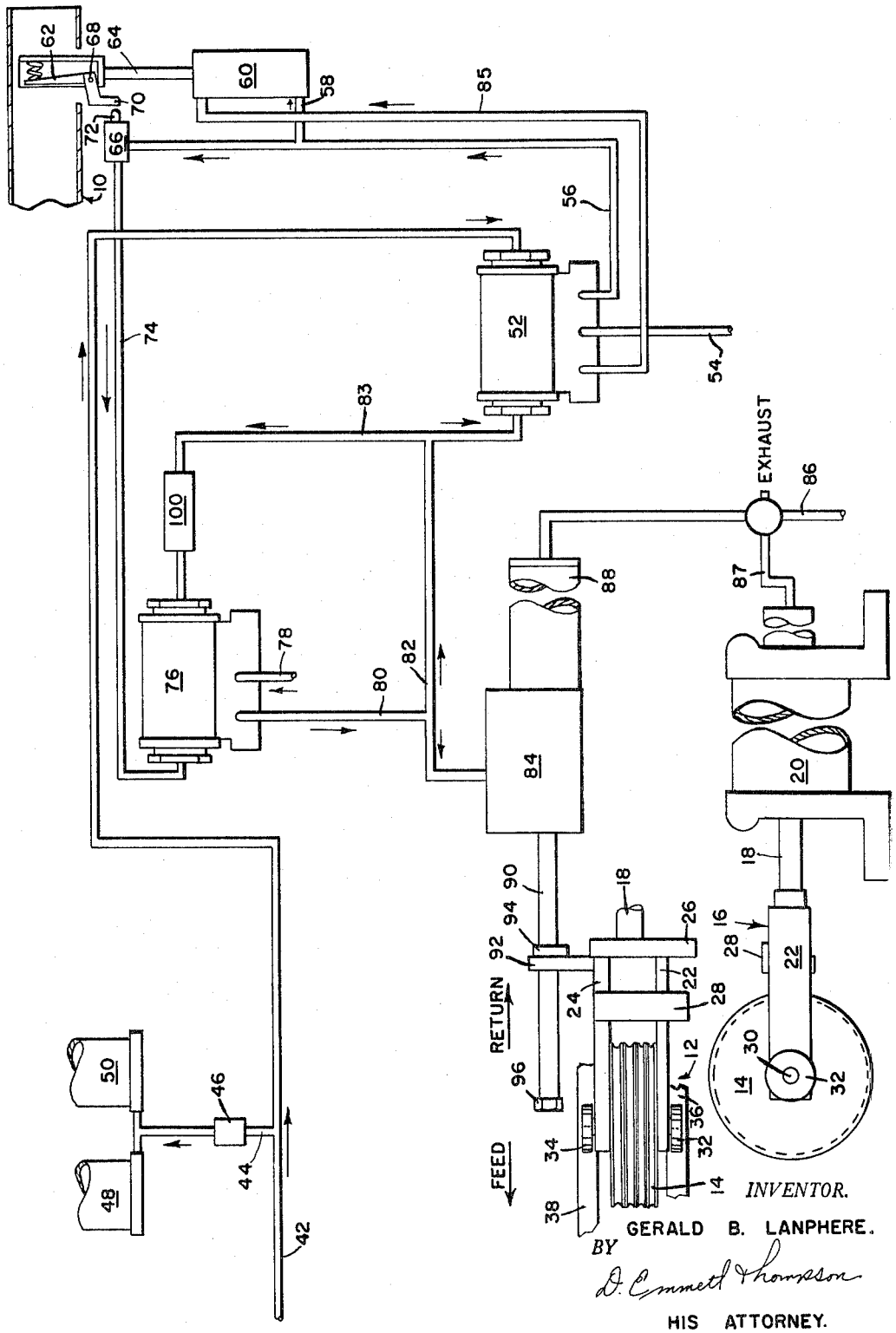
INVENTOR.
GERALD B. LANPHERE.
BY
D. Emmett Thompson
HIS ATTORNEY.

3,274,866
AUXILIARY FACING STOP CONTROL SYSTEM
Gerald B. Lanphere, Central Square, N.Y., assignor to Lipe-Rollway Corporation, Syracuse, N.Y., a corporation of New York
Filed Apr. 10, 1964, Ser. No. 358,833
1 Claim. (Cl. 82—34)

In present day high speed bar working machines, such as lathes, or the like, the tooling has become so advanced and complicated that it is oftentimes impossible to provide the machine with a facing stop because there is not sufficient room left after other tools have been provided.

A facing stop is well known in the art, and simply functions to position each fresh piece of bar stock fed into the bar working machine for end facing. End facing is accomplished by any suitable parting tool and serves to square the end of the fresh bar stock to insure that the first work piece formed will not be faulty. Accordingly, since the facing stop only operates once for each fresh piece of bar stock, where a complex tool arrangement is desired, the facing stop is eliminated in order to provide sufficient room for the other tooling.

Accordingly, it is an object of this invention to provide a bar feed machine with an auxiliary facing stop control system, whereby to position each fresh piece of bar stock fed into the bar working machine for an end facing operation without the necessity for providing the bar working machine with a facing stop.

The invention consists in the novel features and constructions and the method hereinafter set forth and claimed.

In describing the invention, reference is had to the accompanying drawing in which like characters designate corresponding parts in all the views.

For a more detailed description of the bar working machine, which may be provided with the auxiliary facing stop control system, which comprises the subject of this invention, reference may be had to prior Patents 3,092,299, issued June 4, 1963 to Lakins et al., and 2,595,522, issued May 6, 1952 to Harney. Such bar feed machines are provided with a main feed and as will be apparent hereinafter the objects of this invention are accomplished by providing the main cylinder with an auxiliary cylinder, and a control system, so as to position each fresh piece of bar stock loaded into the bar feed machine stock tube for end facing by a suitable tool in the bar working machine.

The drawing is a schematic diagram of the fluid pressure system which functions to control the operation of the auxiliary facing stop system.

In operation of the bar feed machine, the pusher mechanism is located in the stock tube, the forward end of which is indicated at 10 in the drawing, and the pusher is moved forwardly and rearwardly in the stock tube by means of a drive cable system. The drive cable system includes a main carriage 12 which is composed of a plurality of pulley sheaves 14, carried by a frame yoke 16, which is attached to the forward end of the rod 18 of the main cylinder 20. The yoke 16 includes a pair of side members 22 and 24 joined together at their rearward end by a cross piece 26. A valve actuating arm 28 is affixed to the upper edges of the side members 24 and 22. The forward ends of the side members carry a pin 30, on which the pulley sheaves 14 are journalled, and the outer ends of the pin 30 are provided with a pair of rollers 32 and 34, which move on guide tracks 36 and 38 in the main frame of the bar feed machine. For purposes of clarity, the drive cables which pass over the pulley sheaves 14 have not been shown.

Normally, through the drive cable arrangement, shown in the above patents referred to, the feed of the pusher mechanism through the tube 10 is effected by a movement of the carriage 12 to the left, as viewed in the drawing, as indicated by the arrow entitled "FEED," while return movement of the pusher mechanism to the rear of the stock tube 10 is effected by movement of the carriage to the right in the direction of the arrow, entitled "RETURN" in the drawing.

As disclosed in the above-referred to patents, when the pusher mechanism and accordingly, the carriage 12 has moved to its rearwardmost point of travel, a valve (not shown) is operated by the bar 28 to supply fluid under pressure to the line 42. This fluid pressure is supplied by the branch pipe 44 through a flow control valve 46 to a pair of stock tube shift cylinders 48 and 50. These cylinders operate to open the bar stock tube, and to discharge a fresh piece of bar stock into the tube. Thereafter, the bar feed machine control system as disclosed in the patents previously referred to, serves to close the stock tube, and to feed the bar stock forwardly, thus moving the carriage structure to the left, as seen in the drawing. Prior to this time, however, the fluid pressure in line 42 is applied to the righthand pilot port of a four-way valve 52 to shift the pilot in his valve. This causes fluid pressure in the line 54 to pass through the valve 52 and into the line 56. The line 56 is connected by line 58 to the rearward end of a cylinder 60, which serves to operate a bar stop, shown schematically in the drawing, to position the bar stop 62 in the stock tube 10 to be contacted by the fresh bar stock. This is effected by operation of the piston rod 64 of the cylinder 60. At the same time, the pressure in the line 56 is supplied to a three-way normally closed valve 66 for a purpose to be hereinafter described.

After closure of the stock tube, the pusher mechanism begins to feed the fresh piece of bar stock forwardly until it contacts the stop 62, thus halting any further forward feed. The contacting of the stop 62 by the bar stock moves it about its pivot point 68 to cause the tail 70 of the bar stop to engage the actuator 72 of three-way valve 66. This in turn opens the valve 66 and supplies the fluid pressure from the line 56 to the line 74, which is connected to the lefthand pilot port of a four-way valve 76. The pilot of valve 76 is thus actuated, supplying fluid pressure from the line 78 through the valve 76 to the line 80. The line 80 is connected to a line 82, which has one end connected to a conventional diaphragm operated clamp mechanism 84 to actuate the clamp for a purpose next to be described.

The fluid pressure in line 82 is also supplied by line 83 to the lefthand pilot port of the four-way valve 52 to reset the pilot of this valve so as to connect the line 54 to the line 85, in order to provide the forward end of the bar stop cylinder 60 with pressure. This will cause the cylinder 60 to operate so as to withdraw the rod 64, thus removing the bar stop 62 from the stop position in the tube 10.

As the carriage mechanism 12 was moving to the left under the influence of the main feed cylinder 20 and its piston rod 18, the same fluid pressure which was supplied to the rear of the main cylinder 20 by lines 86 and 87 is supplied to the rear end of an auxiliary cylinder 88, to cause its piston rod 90 to move out of the cylinder and to the left, as viewed in the drawing. The rod 90 of auxiliary cylinder 88 passes through a clearance aperture formed in an arm 92, welded on the side member 24 of the main cylinder drive carriage 12, and the rod 90 is provided with an adjustable stop collar 94, which may be affixed in any selected position of adjustment on the rod 90. The outer end of the rod 90 is provided with a nut 96, whereby to limit the movement of the arm 92 on the rod 90, between the collar 94 and the nut 96.

It will, therefore, be understood that the rod 90 is moved out of its cylinder 88, together with the movement of the rod 18 out of the main cylinder 20, so that the collar 94 on the rod 90 of auxiliary cylinder 98 engages the arm 92, and serves to move the carriage 12 along with the main drive force which the carriage receives from the rod 18 of the main cylinder. When the clamp 84 is applied, however, the rod 90 can no longer move out of the cylinder 88, and at this point further movement of the carriage 12, under the influence of the pressure in the cylinder 20 on the piston of rod 18, is limited to the distance between the collar 94 on auxiliary rod 90, and the nut 96 on the outer end of the rod 90. This amount of additional movement of the main carriage 12 serves to position the bar stock, which has now passed out of the end of the tube 10 past the bar stop 62 in the bar working machine for the end facing operation.

At this point, a timing valve 100, which is also supplied with pressure from the line 82 by line 83, is actuated. The timing valve 100 is actuated by the bar working machine. The operation of the timing valve permits the pressure in the line 83 to be supplied to the righthand pilot port of the four-way valve 76 shifting the pilot in this valve, so as to remove the pressure from line 80, which in turn releases the clamp 84. The release of the clamp 84 now enables the rod 90 of the auxiliary cylinder 88 to move out of the cylinder 88, together with the movement of the rod 18 out of the main cylinder 20 to effect the intermittent feed of the bar stock into the bar working machine.

Accordingly, it will be seen that through the operation of the auxiliary cylinder 88, and its rod 90, with collar 94 and nut 96, and the control system just described, each fresh piece of bar stock fed into the bar working machine by the bar feed machine may be positioned in the bar working machine for end facing without necessity for providing the bar working machine with a facing stop. It will be further obvious that the facing stop control system will be operable for all lengths of bar stock, no matter how great the variation, as the operation of the system is tripped, or initiated by the contacting of the forward end of the stock tube, so as to be contacted by the forward end of the fresh bar stock.

What I claim is:

In a bar feed machine having a stock tube and a main cylinder driving a feed carriage for feeding bar stock through said stock tube, the improvement of an auxiliary facing stop control system comprising, an auxiliary feed cylinder having its rod connected to said drive carriage for limited movement relative thereto, said auxiliary cylinder normally supplementing the driving force imparted to said carriage by said main cylinder, stop means in said stock tube for stopping the feed of a fresh bar stock as it approaches the forward end of said tube, signal means operated by said stop means operable to actuate clamp means to clamp the rod of said auxiliary cylinder against further driving advancement and withdraw said stop means from said tube, said drive cylinder driving said carriage an additional amount forward, said amount being determined by the limited movement connection between said carriage and said auxiliary rod, said additional amount of movement positioning said fresh bar stock for end facing and time delay means operable to release said clamp means upon completion of end facing of said bar stock, said limited movement connection between said rod and said carriage comprising an arm affixed to said carriage, said rod passing through a clearance aperture in said arm, said rod having a collar removable affixed thereto for variable positioning along said rod and a nut affixed to the outer end of said rod, said arm being positioned on said rod between said collar and said nut to provide said limited movement between said carriage and said rod.

References Cited by the Examiner

UNITED STATES PATENTS

| | | | |
|---|---|---|---|
| 2,746,128 | 5/1956 | Barron et al. | 82—2.7 X |
| 3,131,587 | 5/1964 | Spohn et al. | 82—2.7 |

WILLIAM W. DYER, JR., *Primary Examiner.*

L. VLACHOS, *Assistant Examiner.*